Figure 1:
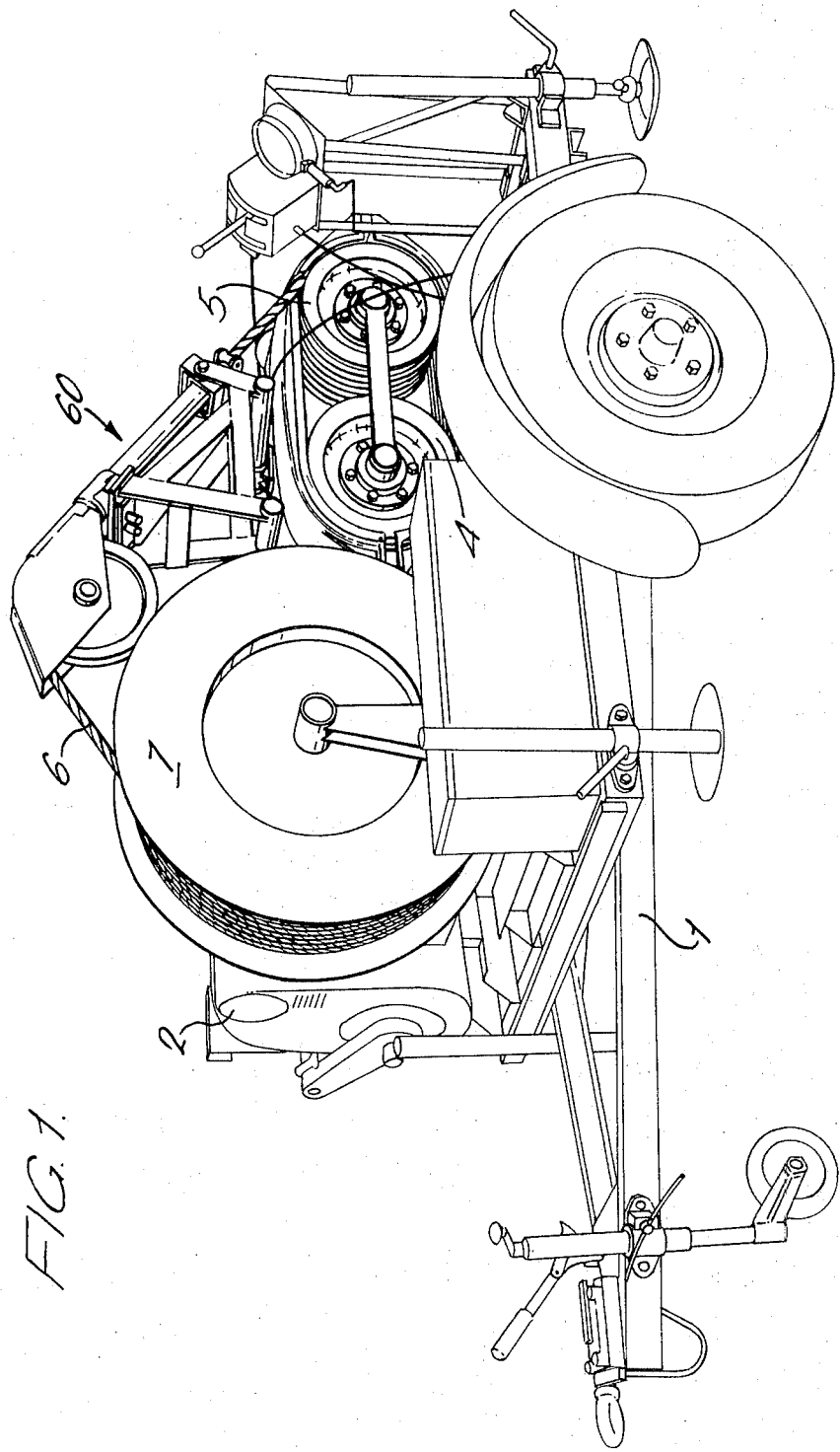

United States Patent [19]
Alexander

[11] 3,834,673
[45] Sept. 10, 1974

[54] TWIN CAPSTAN WINCHES
[75] Inventor: William Alexander, Elstree, England
[73] Assignee: Wharton Engineers (Elstree) Limited, Boreham Wood, England
[22] Filed: May 19, 1972
[21] Appl. No.: 255,175

[52] U.S. Cl. ............ 254/175.5, 192/14, 242/47.08, 254/150 R
[51] Int. Cl. ............................................ B66d 1/76
[58] Field of Search .................... 254/175.5, 150 R; 242/47.08; 192/12 B, 14, 48.3, 48.5; 187/27

[56] References Cited
UNITED STATES PATENTS

| | | | |
|---|---|---|---|
| 1,141,819 | 6/1915 | Moyer | 192/14 |
| 1,682,083 | 8/1928 | Johnston | 187/27 UX |
| 2,385,479 | 9/1945 | Underhill | 192/12 B X |
| 2,463,100 | 3/1949 | Gredell | 192/48.3 X |
| 2,509,791 | 5/1950 | Swanson | 192/12 B X |
| 3,037,720 | 6/1962 | Leithiser | 242/47.08 X |
| 3,071,222 | 1/1963 | Koenig et al. | 192/12 B |
| 3,285,575 | 11/1966 | Griffiths | 254/150 R X |
| 3,680,839 | 8/1972 | Mattinson | 254/175.5 |

*Primary Examiner*—Richard A. Schacher
*Assistant Examiner*—Jeffrey V. Nase
*Attorney, Agent, or Firm*—Burns, Doane, Swecker & Mathis

[57] ABSTRACT

The invention discloses a twin capstan winch including a chain of gears between a power input shaft and a pair of capstan wheels, such gear chain including reduction gears and at least one bevelled gear, whereby the axis of rotation of the capstan wheels is at right angles to the axis of rotation of the power input shaft, the majority of gears being mounted on shafts which lie in or close to the horizontal plane passing through the capstan wheels whereby to lower the centre of gravity of the device.

4 Claims, 7 Drawing Figures

3,834,673

TWIN CAPSTAN WINCHES

BACKGROUND OF INVENTION

The invention related to twin capstan winches. The speed of the available power input of such winches is usually much higher than the speed or speeds of the haulage or capstan wheels thereof, and for this reason a number of gears have to be interposed between the power input shaft and the haulage wheels.

The known gear arrangement for such winches comprises spur gears mounted on shafts extending parallel to the shafts of the haulage wheels and positioned beneath such haulage wheels, and also positioned beneath a cable take-up drum of the winch.

The haulage wheels and also the cable take-up drum are very heavy, and because they are positioned above the said gears, the centre of gravity of the winch is relatively high. This is undesirable, both during use of the winch, and also during transportation of the winch, especially if the winch is mounted on a vehicle or trailer capable of high road speeds or intended for cross-country movement.

SUMMARY AND DESCRIPTION OF INVENTION

An object of the invention is to overcome or minimise the disadvantages arising from the above, and to this end in a twin capstan winch in accordance with the present invention the gears between the power input and the haulage wheels are all mounted on shafts in, or close to the horizontal plane through the haulage wheels.

This is achieved by using bevel gears in the gearbox in appropriate places.

The take-up drum may also be placed beside the haulage wheels instead of directly above such wheels, and this is particularly important in lowering the centre of gravity of the apparatus if the drum is to hold a very heavy length of cable.

Other preferred features of this invention will become apparent from the following description.

Figure 2:
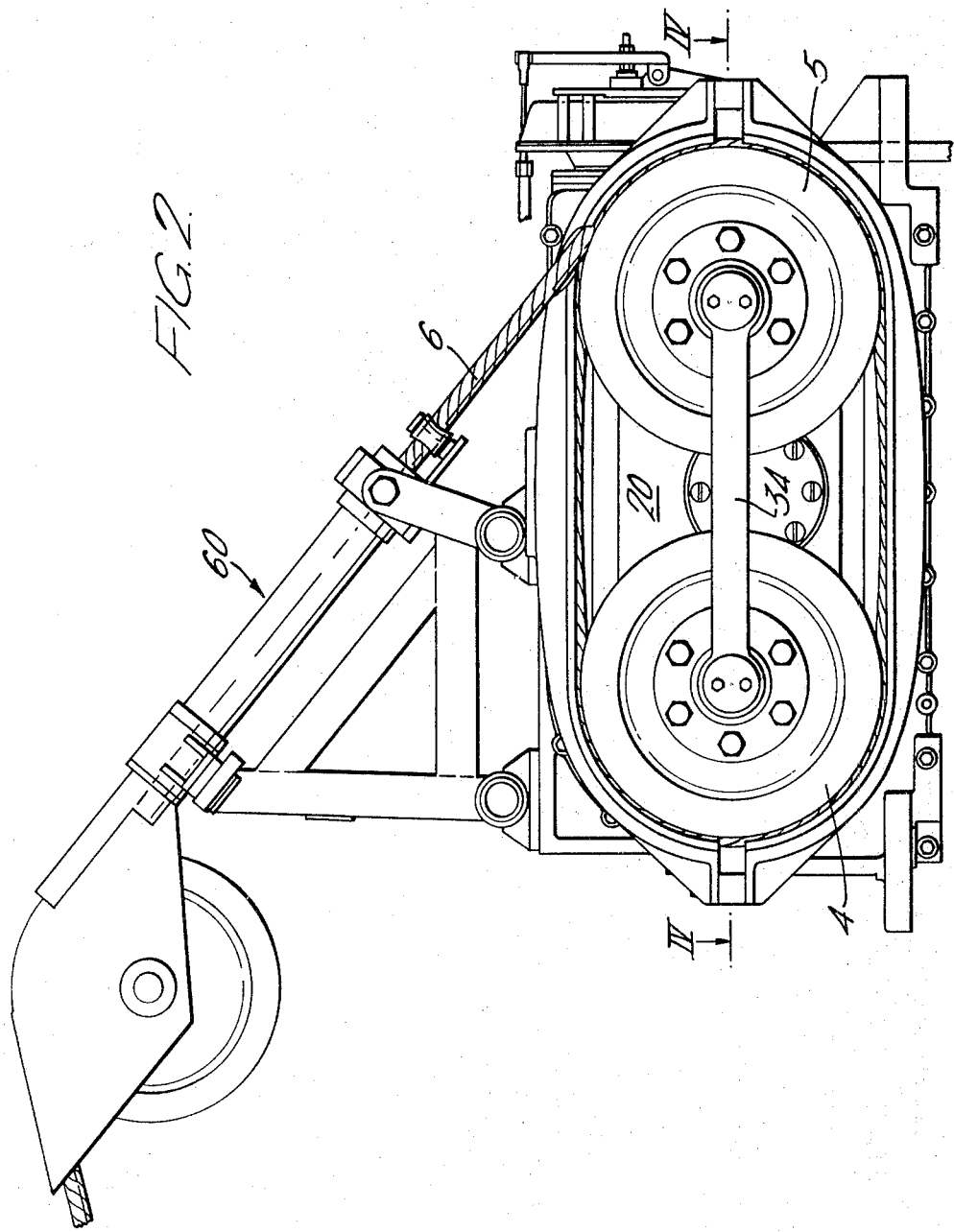
Figure 3:
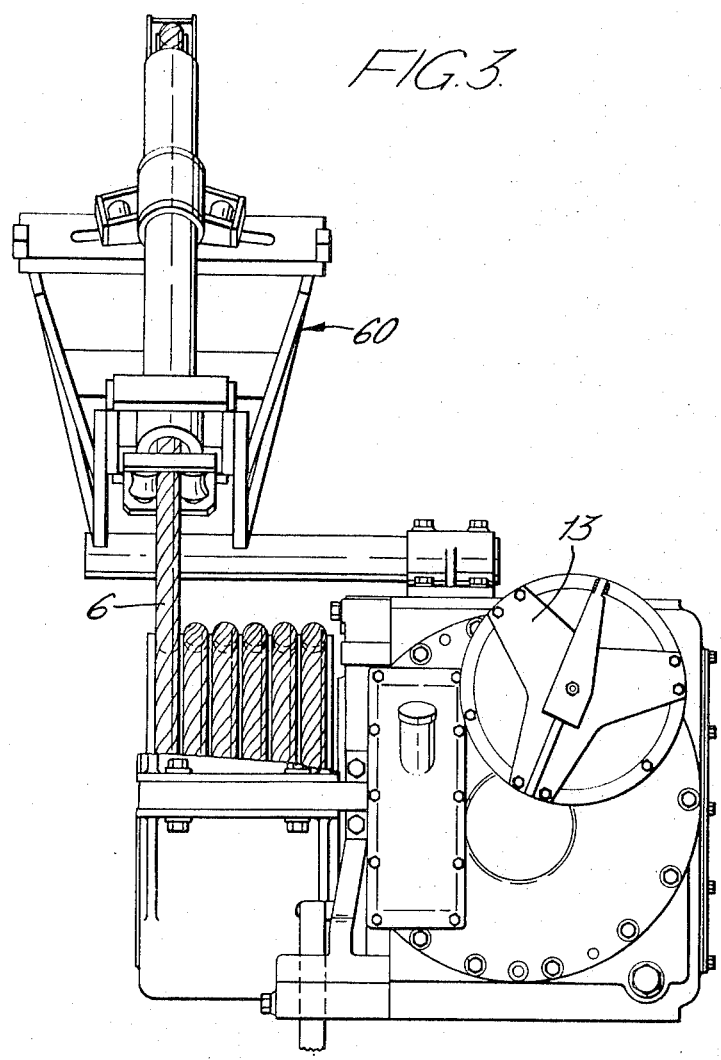
Figure 4:
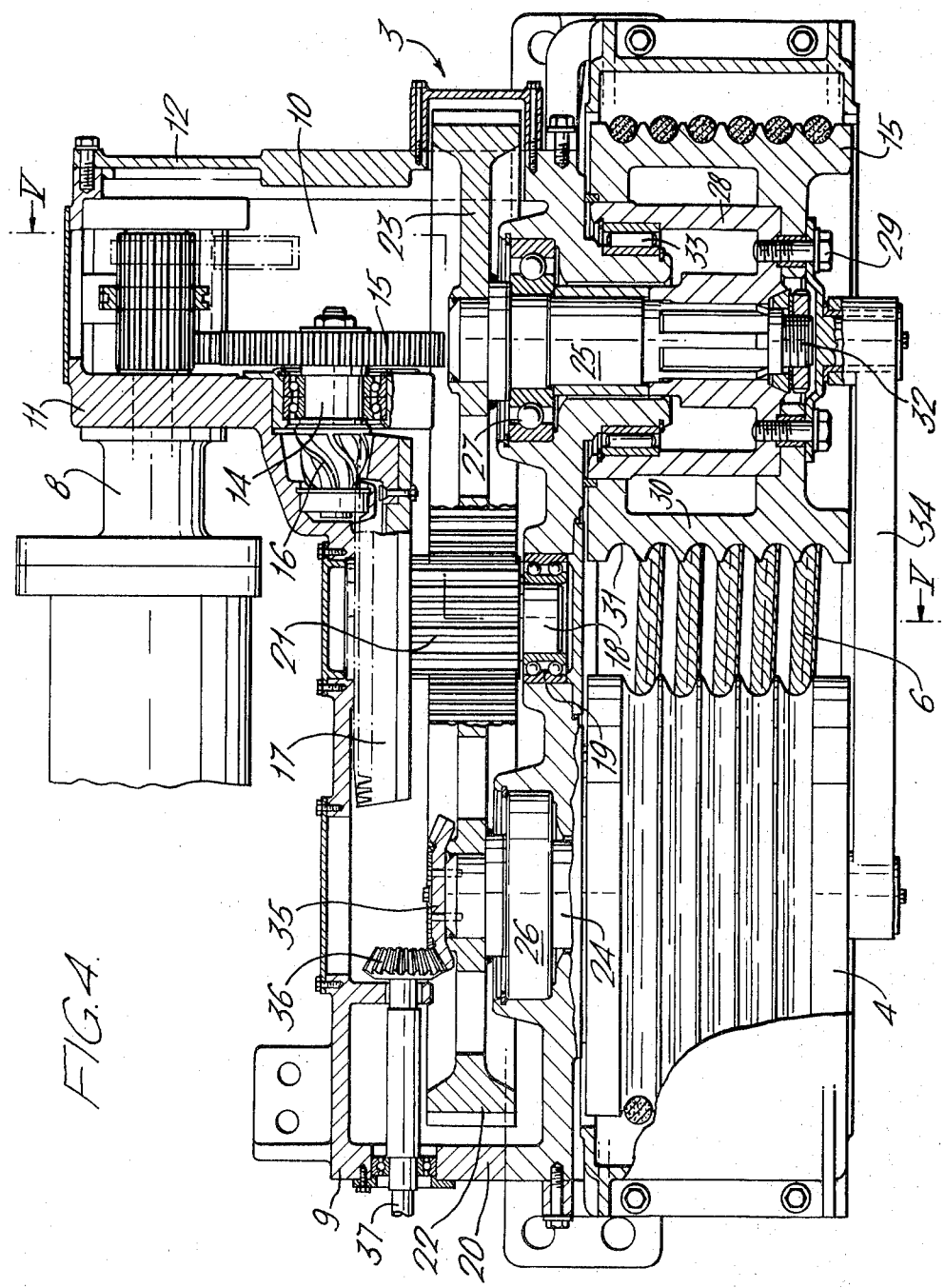
Figure 5:
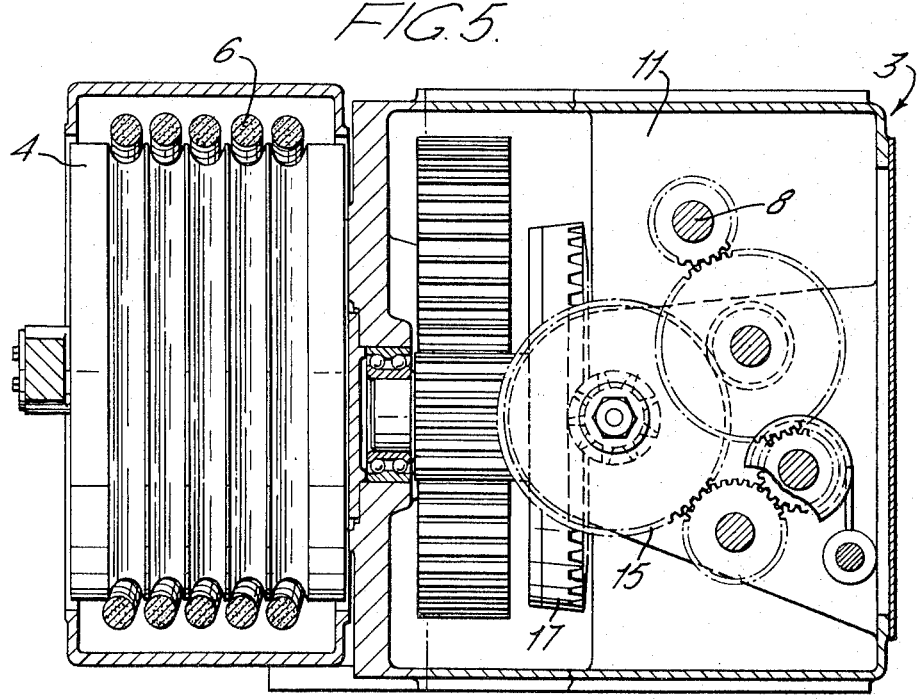
Figure 6:
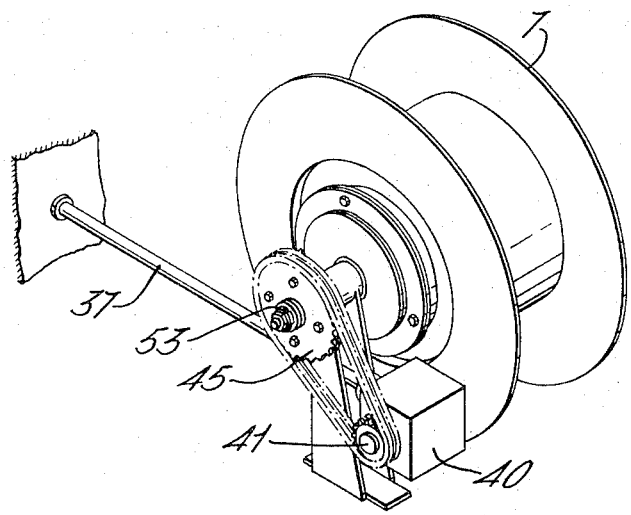
Figure 7:
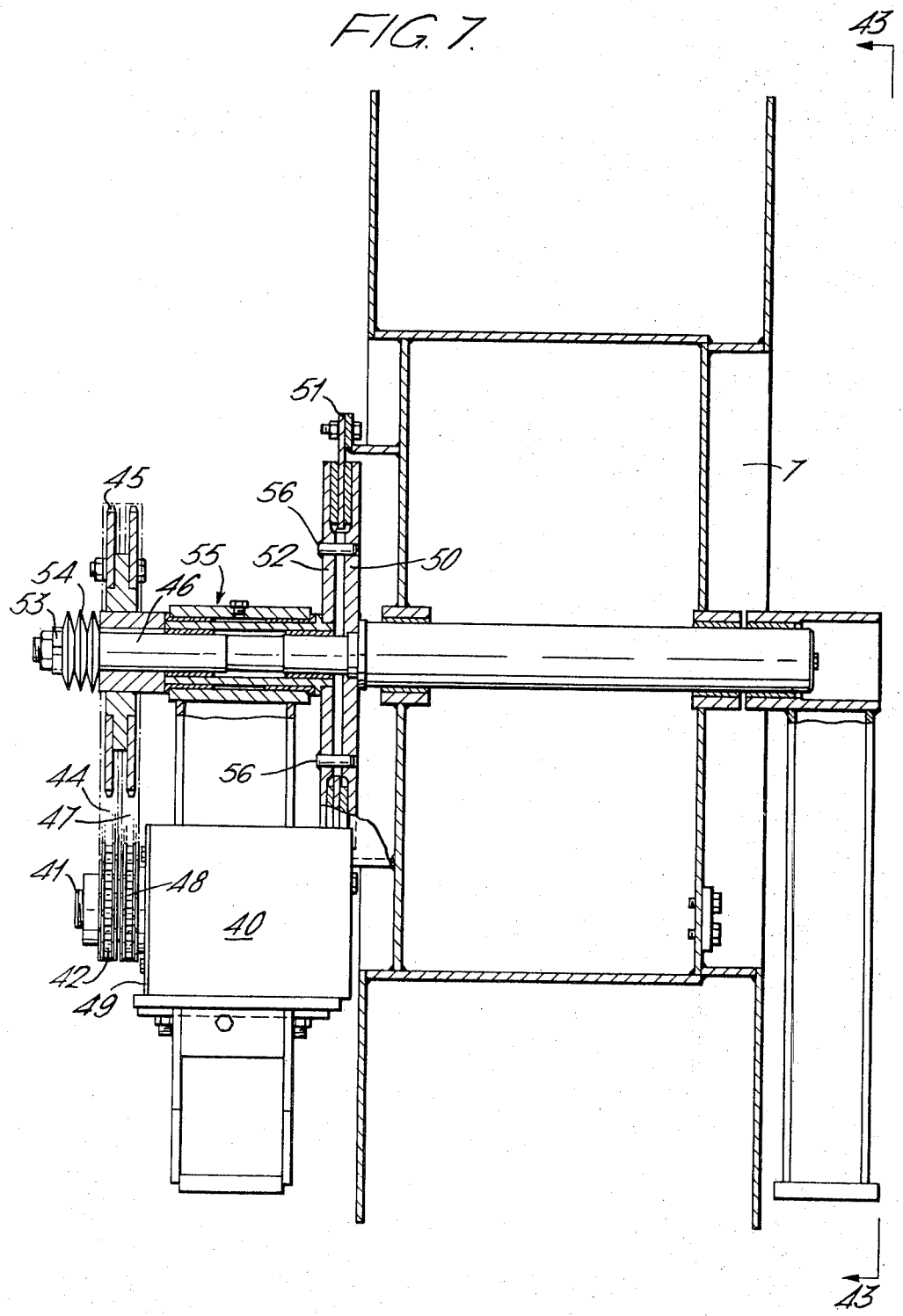

In order that the present invention may be more readily understood, one embodiment of a twin capstan winch according to the invention will now be described by way of example and with reference to the accompanying drawings in which:

FIG. 1 is a perspective view of a twin capstan winch according to the invention mounted on a trailer, the trailer being shown in ghostline, FIG. 2 is a side elevation of a part of the apparatus of FIG. 1, the view showing the twin haulage or capstan wheels and a cable guide, FIG. 3 is a part sectional end elevation showing the said capstan wheels and cable guide, and also a gearbox, FIG. 4 is a part sectional view to an enlarged scale, taken on the line IV—IV of FIG. 2 and showing a power input shaft, and the capstan wheels, and the gearbox, FIG. 5 is a sectional view taken on the line V—V of FIG. 4, FIG. 6 is a simplified perspective view of a cable drum showing a clutch and chain drive thereof, and FIG. 7 is an enlarged sectional view through the drum, clutch and chain drive of the assembly shown in FIG. 6.

Briefly FIG. 1 shows a winch according to the invention mounted on a trailer 1.

A power source is provided by an internal combustion engine 2 mounted on the trailer 1, this engine 2 supplying power to a gearbox 3 (best seen in FIGS. 4 and 5) by a hydraulic transmission (not shown).

The gearbox is arranged to drive grooved haulage or capstan wheels 4, 5 around which a cable 6 extends, one end of such cable (now shown) being connected to a load, and the other end of the cable being wound on a storage drum 7 rotatably mounted on a frame of the trailer 1. The storage drum is arranged to be driven by a chain and clutch device by way of an output from the gearbox.

Referring now to the apparatus in more detail, FIGS. 4 and 5 show the gearbox 3, the gearbox having a power input shaft 8 driven by the above mentioned hydraulic drive. The gearbox 3 is generally L-shaped as viewed in FIG. 4, having a longer casing part 9 extending parallel to the shaft 8 and a shorted casing part 10 extending at right angles therefrom. The shaft 8 extends through one wall 11 of the shorted casing part 9, which casing part 9 houses a primary gearbox, the gear wheels of which are spur gears accessible after the removal of a cover plate 12. The specific arrangement of gears within the primary gearbox forms no part of the invention, but it is chosen to provide at least one forward gear and at least one reverse gear, and preferably also a neutral gear. A gear change is achieved by any suitable gear lever (not shown). A safety brake device is provided as generally indicated at 13 in FIG. 3, this safety device 13 being spring loaded and operative to prevent or retard movement of the gears unless it is pulled off.

The provision of a primary gear box which is readily accessible as shown is particularly advantageous since with such an arrangement the gear ratios may easily be varied by interchanging gear wheels to suit the requirement of each user or customer.

The output from the primary gearbox is by way of a rotatably mounted shaft 14 having fixedly mounted on the driven end of the shaft a spur gear 15 of the primary gear box, and having fixedly mounted on the other end thereof a bevel gear wheel 16. The gear wheel 16 meshes with a crown wheel 17, such crown wheel being fixed mounted on a shaft 18 which is rotatably journalled at its ends. One end of the shaft 18 is rotatable in ball race 19 mounted on a carrier plate 20, which plate carries the capstan wheels and forms one wall of the gearbox. Also fixedly mounted on the shaft 18 is a spur gear wheel 21, the teeth of which mesh with the teeth of spur gear wheels 22, 23 which lie one on either side of the shaft 18. These wheels 22, 23 are fixedly mounted on respective shafts 24, 25 which are rotatably mounted in respective ball races 26, 27 mounted on the said carrier plate 20.

The shafts 24, 25 extend through the carrier plate 20, and securely bolted to the free ends of the shafts are the above mentioned capstan wheels 4, 5. Capstan wheels 4 and 5 are very similar to one another, and therefore only the capstan wheel 5 shown in section in FIG. 4 will be described in detail. The wheel 5 has an inner central hub part 28 to which is bolted by means of bolts 29 an outer portion 30 provided with peripheral cable receiving grooves 31. It is to the inner hub portion of the wheel that the shaft 25 is bolted by means of a suitable nut and washer arrangement 32. The capstan wheel 5 is rotatably mounted on a needle roller bearing 33, such bearing extending around a part of the carrier plate 20. It will readily be appreciated that the respective needle roller bearings relieve the shafts 24 and 25 from bending stresses which is a further very advantageous feature of the embodiment described. The main stresses are carried by the relatively strong carrier plate 20.

The extreme ends of the shafts 24 and 25 are connected together by means of a strengthening strap 34.

Referring still particularly to FIG. 4, it will be seen that a crown wheel 35 is secured by any suitable means to that end of the shaft 24 which lies within the gearbox. The teeth of the crownwheel 35 mesh with the teeth of a bevel gear wheel 36 which is fixedly mounted on the end of a shaft 37 which is rotatably mounted and extends through one wall of the gearbox 3. The shaft 37 serves as a drive shaft to drive the cable take-up drum 7 by means of an arrangement to be described in more detail below with reference to FIGS. 6 and 7.

Referring now to FIGS. 6 and 7, the drive shaft 37 from the gearbox 3 extends into an adaptor box 40 within which it is drivingly connected, e.g. by a bevel gear, to a shaft 41 extending at right angles to the shaft 37. Mounted on the shaft 41 is a chain wheel 42 incorporating a freewheel device, the inner part of the freewheel device being fixedly mounted on the shaft 41.

The terms "clockwise" and "anticlockwise" are used hereinafter in the description of the FIG. 7, the terms being applied to the apparatus as viewed in the direction of the arrows 43 in FIG. 7.

The freewheel device of chain wheel 42 is so arranged that when the shaft 41 is driven to rotate in an anticlockwise direction the wheel 42 is forced to turn with the shaft, but when the shaft 41 is driven in a clockwise direction, the wheel 42 may remain stationary.

A chain 44 passes over the chain wheel 42 and also over one wheel of a double chain wheel 45 keyed to a shaft 46 whereby when shaft 41 is driven to rotate anti clockwise the double chain wheel 45 and shaft 46 are also driven to rotate in an anti clockwise direction by means of the chain 44.

Extending around a second wheel of the double chain wheel 45 is a second chain 47 such chain 47 also extending over a second chain wheel incorporating a freewheel device and referenced 48.

The inner part of the freewheel device of wheel 48 is not mounted on the shaft 41, but is instead fixedly mounted on an end plate 49 of the box 40.

The freewheel device of wheel 48 is so arranged that the outer part thereof over which the chain 47 extends can turn in an anticlockwise direction, but not in a clockwise direction.

As stated above, the double chain wheel 45 is keyed to a shaft 46, and also keyed to the shaft is a friction coupling plate 50 which bears by means of a friction pad on one side of a flange 51 bolted onto the cable drum 7, which drum 7 is rotatably mounted on the shaft 46 and is axially slidable thereon.

Axially movable on the shaft 46 is a second friction coupling plate 52 which bears by means of a friction pad on the opposite face of flange 51 whereby the flange 51 is trapped between the friction pad of two friction plates 50 and 52. Plate 52 is prevented from rotating on the shaft by means of pins 56 extending through the plates 50 and 52.

Means are provided to adjust the force which the plates 50 and 52 exert on the flange 51 whereby the frictional coupling between the plates and the drum 7 can be varied. Such means include a nut 53 screw threaded on the end of the shaft 46, a spring washer arrangement 54 axially slidable on the shaft 46 and positioned between the nut 53 and the double chain wheel 45 which is also axially slidable on the shaft 46, and a thrust bearing arrangement generally designated 55 which is also axially slidable on the shaft 46.

It will be understood that when the nut 53 is tightened, the spring washer arrangement 54 is compressed, and thrust is transmitted via the wheel 45 and thrust bearing 55 to the plate 52 to increase the frictional engagement between the plates and the flange 51. Conversely, slackening of the nut 53 reduces the frictional engagement.

Operation of the drive arrangement of the drum will now be described. When the gearbox 3 is in forward gear for winding in a cable the drive shaft 37 for the drum 7 causes the shaft 41 to rotate in an anti-clockwise direction.

This in turn causes the freewheel device of wheel 42 to lock so that the wheel 42 rotates and drives double chain wheel 45 and shaft 46 in an anti-clockwise direction. During such rotation chain 47 drives the chain wheel 48 which is mounted on the fixed end plate 49, the freewheel device permitting the chainwheel 48 to rotate anti-clockwise. Rotation of the shaft 46 causes anti-clockwise rotation of the friction plates 50 and 52, which in turn drives the drum 7 (via flange 51) to rotate anti-clockwise to thus reel in cable.

Of course the fastest speed at which the drum 7 can rotate to reel in cable is determined by the rate at which the cable is reeled in by rotation of the capstan wheels, the friction between the cable and the capstan wheels being very high. However, the gearing within box 40 is chosen to drive the shaft 46 at a higher rate than said fastest speed, so that slip must occur in the friction coupling device 50, 51, 52. This has the effect of ensuring that the cable is at all times kept taught which facilitates operation of a cable spooling device generally designated 60.

When it is desired to gradually pay out the cable, the winch is put into reverse, and the capstan wheels are rotated in a direction to pay out the cable and, because of the high friction between the capstan wheels and the cable, the drum is forced to rotate clockwise to pay out the cable.

During such clockwise rotation of the drum, the shaft 46 and the friction plates 50 and 52 are hold against rotation because as stated above, the freewheel device on the wheel 48 prevents rotation of such wheel in a clockwise direction. Because the friction plates are held as the drum rotates, slipping occurs between the flange 51 and the friction plates 50, 52 and this acts as a safety brake and also ensures regular paying out of the drum.

Because the gearbox is in reverse, the shaft 41 rotates in a clockwise direction during paying out of cable, and this occurs without rotation of the wheel 42 because of the freewheel device. The drum driving arrangement is a particularly advantageous feature of the described embodiment. Another advantageous feature will be appreciated from a consideration of FIG. 4, from which it is apparent that the shafts 8, 14, 18, 24, 25 and 37 are all arranged to lie in the horizontal plane passing through the capstan wheels. This achieves a very compact gearbox and a low centre of gravity for the winch and means that the trainer is relatively stable. In use of the winch, the cable will extend towards a load in a direction generally in line with the longitudinal centre line of the trailer whereby the pull on the cable will not be likely to overturn such trailer.

What is claimed is:

1. Capstan winch apparatus for paying out and taking up cable, the apparatus comprising:

a storage drum including a continuous friction flange, said drum being rotatable in a pay out direction and take up direction opposite thereto;

capstan wheel means operable to be driven in a take up direction and a pay out direction opposite thereto;

said capstan wheel means, when driven in said pay out direction, being operable to remove cable from said drum;

said capstan wheel means, when driven in said take up direction, being operable to deliver cable toward said drum;

drive means for driving said capstan wheel means in said pay out and take up direction, said drive means being additionally operable to drive said drum in said take up direction at a take up rate faster than the take up rate of said capstan wheel means, and being operable to effect pay out rotation of said drum in response to pay out rotation of said capstan wheel means, said drive means including:

a reversible power source for driving said capstan wheel means in a cable pay out and a cable take up direction;

drum take up drive means for receiving power input from said reversible power source and delivering take up power to said drum, said drum take up drive means comprising:

a friction plate disposed adjacent said drum, and operable to rotate in a take up direction about the axis of rotation of said drum for slippingly and frictionally engaging said flange to drive said drum in a take up direction;

gear means driven by said reversible power source, said gear means including free wheel means operable to transmit take up power from said reversible power source to said drum through said friction plate and further operable to hold said friction plate against rotation in a pay out direction;

said drum, during driving of said capstan wheel means in a pay out direction, being itself turned in said pay out direction solely in response to cable removed by said capstan wheel means;

said friction plate, when held by said free wheel means against rotation in said pay out direction, being operable to regulate and brake pay out of cable from said drum by frictionally engaging said flange; and said drive means, when driving said capstan wheel means and said friction plate in said take up direction, being operable to continuously effect said take up rotation of said friction plate, which slippingly engages said flange, in said take up direction at a faster rate than the rate of take up driving of said capstan wheel means, to maintain in a taut condition cable delivered toward said drum by said capstan wheel means.

2. The capstan winch apparatus of claim 1 wherein said drive means comprises shafts which lie substantially in a horizontal plane passing through the axis of rotation of said capstan wheel means.

3. The capstan winch apparatus of claim 1 wherein the axis of rotation of said capstan wheel means is substantially perpendicular to the axis of rotation of said reversible power source.

4. The twin capstan winch apparatus of claim 1 wherein at least a portion of said drive means is disposed in a generally L-shaped gear box means, said gear box means having a longer part extending parallel to a longitudinal axis of said reversible power source and a shorter part extending substantially perpendicular to said longitudinal axis.

* * * * *